United States Patent [19]
Rosenwasser et al.

[11] Patent Number: 5,760,367
[45] Date of Patent: Jun. 2, 1998

[54] APPARATUS AND METHOD OF ENGRAVING INDICIA ON GEMSTONES, AND GEMSTONES, PRODUCED THEREBY

[75] Inventors: Joel M. Rosenwasser, Dresher, Pa.; James Geswelli, Florham Park; Todd Knichel, Hackettstown, both of N.J.

[73] Assignee: Engraving Technologies, Inc., Horsham, Pa.

[21] Appl. No.: 635,167

[22] Filed: Apr. 23, 1996

Related U.S. Application Data

[63] Continuation-in-part of Ser. No. 442,219, May 16, 1995.

[51] Int. Cl.$^6$ .................................................. B23K 26/00
[52] U.S. Cl. ........................ 219/121.69; 219/121.85; 427/555; 63/32
[58] Field of Search ................ 219/121.68, 121.69, 219/121.85; 63/32; 125/30.01; 427/555; 264/DIG. 55

[56] References Cited

U.S. PATENT DOCUMENTS

| | | | |
|---|---|---|---|
| 58,410 | 10/1866 | Hartell | 63/32 |
| 240,496 | 4/1881 | Appel et al. | 63/32 |
| 1,578,542 | 3/1926 | Merle, Jr. | 63/32 |
| 3,601,576 | 8/1971 | Schlafli et al. | 219/121.71 |
| 4,126,500 | 11/1978 | Palanos | 219/121.69 |
| 4,386,123 | 5/1983 | Coburn, Jr. | 428/67 |
| 4,392,476 | 7/1983 | Gresser et al. | |
| 4,467,172 | 8/1984 | Ehrenwald et al. | |
| 4,809,417 | 3/1989 | Normann, Jr. | 63/32 |
| 5,149,938 | 9/1992 | Winston et al. | |
| 5,423,714 | 6/1995 | Lach | 63/32 |

Primary Examiner—Teresa J. Walberg
Assistant Examiner—Gregory L. Mills
Attorney, Agent, or Firm—Caesar, Rivise, Bernstein, Cohen & Pokotilow, Ltd.

[57] ABSTRACT

Apparatus and methods for decorating a gemstone with colored indicia so that the indicia is readily visible from an exterior surface of the gemstone. The indicia is engraved on an predetermined exterior surface portion of the gemstone. The exterior surface on which the indicia is engraved may be the exterior surface from which it is visible, or another surface. The gemstone may be semi-precious, man-made, or precious, and can be faceted or cabochon. The indicia is engraved in the exterior surface by a laser beam. The laser beam is directed to the exterior surface, while the gemstone is held in a manner so that a significant portion of the laser beam is precluded from reflecting internally within the gemstone, thereby ensuring that the gemstone is not damaged by the laser beam. Once engraved a colored inlay, e.g., paint, is provided in the engraved recess to complete the decorative indicia. The decorative indicia is of a sufficient size for the message thereof is readily visible to the naked eye of a person when viewing it from the from predetermined exterior surface.

11 Claims, 3 Drawing Sheets

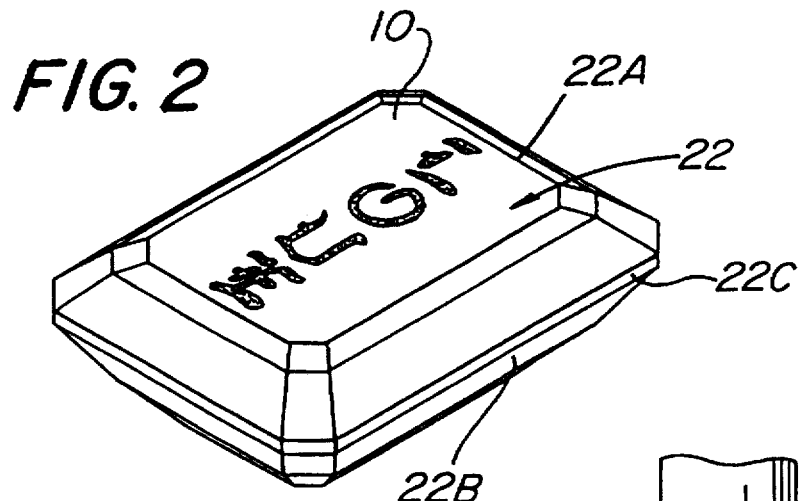
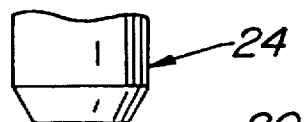
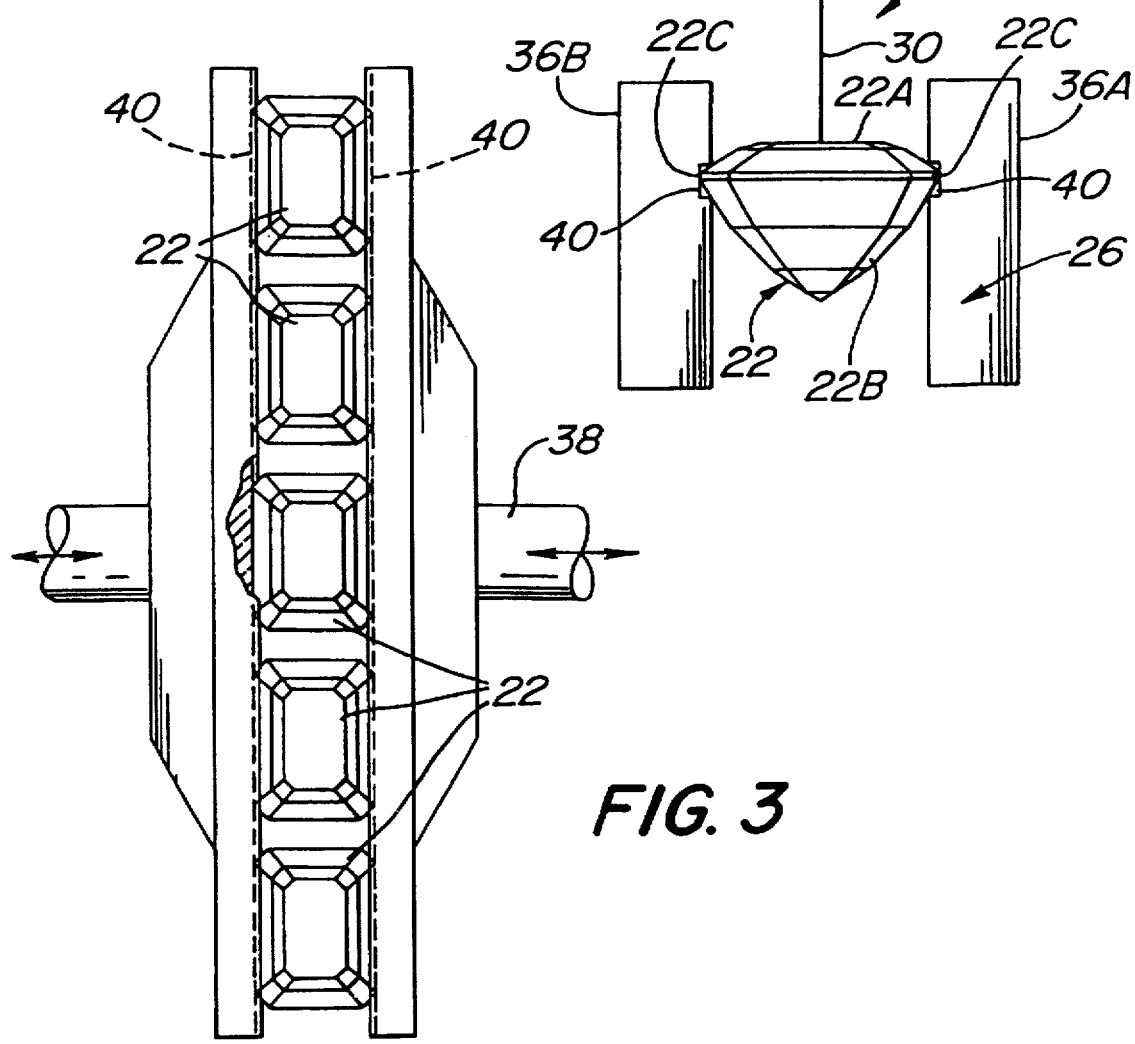

APPARATUS AND METHOD OF ENGRAVING INDICIA ON GEMSTONES, AND GEMSTONES, PRODUCED THEREBY

RELATED APPLICATION

This is a Continuation-In-Part of our earlier Application Ser. No. 08/442,219, filed on May 16, 1995, entitled Apparatus And Method Of Engraving Indicia On Gemstones And Gemstones Produced Thereby, which is assigned to the same assignee as this invention, and whose disclosure is incorporated by reference herein.

BACKGROUND OF THE INVENTION

This invention relates generally to the making of jewelry, and more particularly to apparatus and methods for engraving indicia on precious and semi-precious and synthetic gemstones by means of a laser, and the gemstones produced thereby.

There have been many attempts at applying laser-induced indicia on the surfaces of gemstones. In practice, the only successful application of this concept has been the application of identifying indicia on the surface, specifically, the girdle, of a diamond. Diamonds, being the most expensive and most desired gemstone, have been successfully engraved with this form of indicia to provide a serial number or associated appraisal number that contains the full description of the characteristic of the particular diamond on its girdle. In order to be invisible to the naked eye the height of each of the characters making up the serial number or appraisal number is extremely small, e.g. 0.0025 inch (0.064 mm).

The application of indicia by laser to a gemstone surface has heretofore typically required that the target surface not be polished, i.e., be of somewhat rough finish in order to absorb the laser energy. Alternately and more commonly the target surface has a laser-light absorptive coating of some material, e.g. paint or ink, thereon. This coating is arranged to be removed after the indicia has been engraved onto the target surface by the laser beam. As will be appreciated by those skilled in the art, the rough or coated surface absorbs the energy of the laser beam impinging it to, thereby, vaporizing it and the underlying gemstone material.

While the above described process has proven successful in the practice for marking of diamonds with very tiny identification indicia, it has not been used to produce large engravings, e.g. decorative indicia, on the major facets of diamonds or other gemstones, particularly semi-precious or man-made gemstones. The reason for such limited use is because of high losses incurred in producing indicia render the practice too costly to be practical on a mass production basis on lower value gemstones.

United States Pat. Nos. 4,392,476 (Gresser et al.), 4,467,172 (Ehrenwald), and 5,149,938 (Winston et al.), all disclose the application of indicia to the edge of a diamond to mark the serial type thereon. None of the foregoing patents addresses the concerns of marking other gemstones and synthetics, like sapphire, topaz, zirconia, the like. These stones have a significantly different stature in the jewelry industry, and the application of a laser to mark serial numbers on the girdles of such stones would not be practical, since the cost for inexpensive semi-precious and man-made stones would be greater than the cost of applying a laser beam to them.

However, such stones are ideal candidates for decorative markings on any particular facets of these stones, since typically they are much larger than diamonds. Thus, the prior art does not deal with the problems incurred by applying indicia to the table or large pavilion facets commonly found on these stones. In particular, the application of large indicia markings on precious, semi-precious, and man-made or synthetic gemstones by laser is fraught with peril of damaging the stone due to buildup caused by internal reflections of the laser beam within the stone.

OBJECTS OF THE INVENTION

Accordingly, it is a general object of this invention to provide apparatus and methods of use which overcomes the disadvantages of the prior art and which addresses the needs of the jewelry industry for decorated gemstones.

It is another object of this invention to provide a method of applying indicia at or below an exterior surface of a gemstone by a laser beam, without risking damage to the gemstone.

It is still another object of this invention to provide a method of applying indicia to an exterior surface of a gemstone by a laser beam, by supporting the gemstone with respect to the laser beam in such a manner that internal reflections of that beam within the gemstone are minimized, to preclude heat-induced damage thereto.

It is still another object of this invention to provide simple and low cost apparatus for use with a laser for applying indicia to an exterior surface of a gemstone by a laser beam, by supporting the gemstone with respect to the laser beam in such a manner that internal reflections of that beam within the gemstone are minimized.

It is yet another object of this invention to provide gemstones bearing laser-applied indicia on an exterior surface thereof.

It is yet another of object of this invention to provide gemstones bearing laser-applied recesses filled with some colored inlay material to result in distinctively colored indicia.

SUMMARY OF THE INVENTION

These and other objects of this invention are achieved by providing apparatus and methods for engraving indicia on gemstones and coloring the indicia to result in a decorated gemstone with distinctively color indicia for conveying a message.

The decorative indicia comprises a shallow depth recess engraved by a laser beam and having a visually distinctive colored inlay disposed within the recess. The colored inlay may be a single color or multiple colors. The decorative indicia is of a sufficient size for the message thereof to be readily visible to the naked eye of the person when viewing the indicia from the first predetermined exterior surface so that the message can be readily perceived by the person.

In accordance with one aspect of the invention the surface in which the recess is engraved constitutes the surface from which the indicia is visible to the person, e.g., the top or table surface of a faceted-cut gemstone. In accordance with another aspect of the invention the surface in which the recess is engraved constitutes another exterior surface, other than the surface from which the indicia is visible to the person, e.g., the undersurface of a cabochon-cut gemstone.

DESCRIPTION OF THE DRAWINGS

Other objects and many attendant features of this invention will become readily appreciated as the same becomes better understood by reference to the following detailed description when considered in connection with the accompanying drawings wherein:

FIG. 1 is a side elevational view of the process of engraving a gemstone using one embodiment of the apparatus of this invention;

FIG. 2 is an enlarged isometric view of a gemstone of the subject invention, which has been engraved with decorative indicia using the apparatus of the subject invention and in accordance with the method of the subject invention, and wherein the decorative indica is visible directly from the table or top surface of the gemstone;

FIG. 3 is a reduced top plan view of one embodiment of the apparatus of this invention supporting plural gemstones for engraving;

DETAILED DESCRIPTION OF THE PREFERRED EMBODIMENTS

Figure 4:
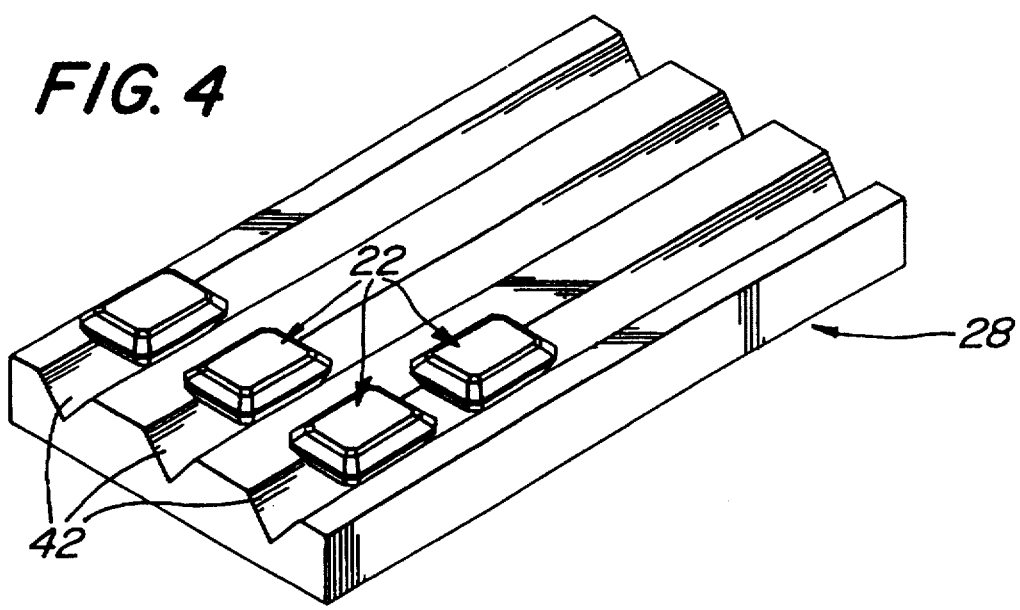
FIG. 4 is an isometric view of a second embodiment of the apparatus of this invention supporting plural gemstones for engraving.

Referring now to various figures of the drawing where like reference numerals refer to like parts there is shown at 20 in FIG. 1, a system for engraving a portion of the exterior surface of a gemstone 22 with a laser beam. The system basically comprises a conventional industrial beam-steered laser marking apparatus 24, such as that commercially available from Excel Control Laser, Inc. of Orlando, Fla. under the trade designation INSTAMARK Laser Marking System, and a gemstone support or holder 26 or 28 (FIGS. 1 and 4, respectively) constructed in accordance with this invention. The laser marking apparatus 24 includes a Nd-YAG laser (or other laser, such as a $CO_2$) for producing a finely focussed laser beam 30. The beam 30 is arranged to be directed by the apparatus 24 to the surface of some material to be engraved. In this application that surface consists of a portion of the exterior surface of a gemstone 22 (precious, semi-precious, or man-made).

In accordance with one preferred embodiment of this invention the gemstone comprises a semi-precious or man-made gemstone whose upper surface, e.g., crown or bezel 22A, or lower surface 22B, e.g., pavilion, is to be engraved by the laser beam 30. The gemstone 22 is arranged to be supported or held so that the surface 22A to be engraved can be impinged and traversed by the laser beam 30. The support for the gemstone during this procedure is provided by either the holder 26 or 28.

The details of the holders 26 and 28 will be described later. Suffice it for now to state that each holder is arranged to hold and support plural gemstones 22 therein for engraving by the laser beam. Moreover, each of the holders is constructed so that it will enable the laser beam which impinges on the surface 22A to be engraved to engrave the gemstone material underlying that surface, and then to readily exit the gemstone, without substantial internal reflection. This action is of extreme importance to ensure that the hazard of heat-induced damage to the gemstone is minimized, if not altogether eliminated.

The following constitutes a description of the process for engraving the table 22A, i.e., the top surface of the crown or bezel, of semi-precious or man-made gemstones 22 with large decorative indicia 10 to produce gemstones like that shown in FIG. 2. As can be seen in that figure the decorative indicia 10 constitutes the word "LOVE." This is purely exemplary of any type of large decorative indicia, letters or graphics or both, which can be engraved on the gemstone.

Figure 6:
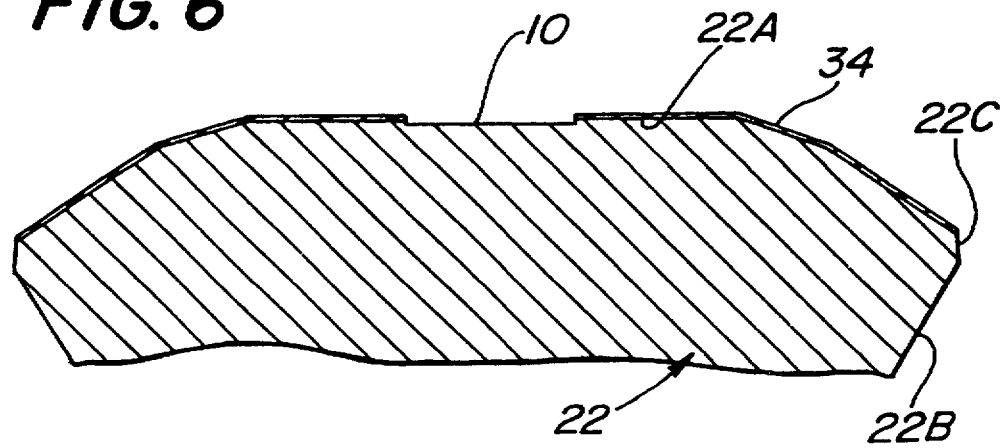
FIG. 6 is an enlarged, vertical sectional view of a gemstone which has been coated so that it can be readily engraved in accordance with the subject invention.

In order to engrave the table 22A of the gemstone it has applied thereto any suitable laser-light absorptive coating 34, e.g., paint, ink, or dye as shown in FIG. 6. The coated gemstones 22 are then mounted in the holder 26 or 28 in a manner to be described later, wherein their surfaces to be engraved are directed upward toward the laser apparatus 24. It should be noted that the use of a coating 34 is not mandatory. Thus, in some applications the stone to be engraved is uncoated.

Before describing the engraving process further a description of the details of the holders 26 and 28 is in order. Thus, as can be seen clearly in FIGS. 1 and 3, the holder 26 basically comprises a pair of elongated jaws 36A and 36B, and means, e.g., threaded screws 38 for moving the jaws 36A and 36B towards and away from each other to form a vice-like arrangement. Each of the jaws includes a linear groove or recess 40 extending along the length thereof so that the grooves are aligned directly opposite each other as shown in FIGS. 1 and 3. The grooves 40 are arranged to receive respective peripheral portions of the girdle 22C of the plural gemstones 22 to be engraved, as shown in FIG. 3. By tightening the screws 38 the jaws 36A and 36B are brought closer together to tightly hold the plural gemstones 22 in position, with their coated tables 22A facing upward for impingement by the laser beam 26.

In the interests of ensuring that internal reflections within the gemstones 22 are minimized during the engraving process, the jaws 36A and 36B, or at least portions contiguous with the grooves 40, are formed of a laser-light transmissive, e.g., transparent, material. One such material comprises the plastic, such as, polycarbonate, or any other transparent plastic or glass.

Figure 5:
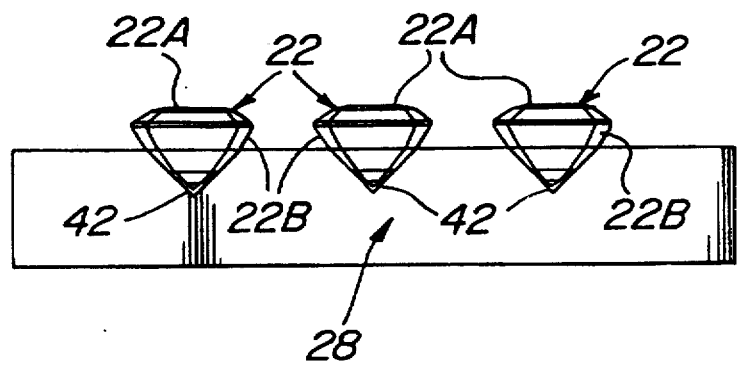
FIG. 5 is a side elevational view of the second embodiment of the apparatus of this invention shown in FIG. 4.

Referring now to FIGS. 4 and 5 the details of holder 28 will now be described. There, as can be seen therein the holder 26 basically comprises a generally planar base having plural recesses or grooves 42 extending along the length thereof. The recesses are arranged to receive the pavilion portion of the gemstones 22 to be engraved by the laser beam 30. To that end each groove 42 is of a general V-shape. In the interests of ensuring that internal reflections within the gemstones 22 are minimized during the engraving process, the base, or at least portions contiguous with the grooves 42, is formed of a laser-light transmissive material, like that described above with reference to holder 26.

With the coated gemstones 22 in either holder 26 or 28, the holder is then placed on some support or table (not shown) disposed in the path of the laser beam 30 so that the coated surface 22A of the gemstones is the appropriate distance away from the laser, i.e., the coated surface is in the focal plane of the laser beam. The laser beam is then directed across the coated surface of a first of the gemstones to be engraved to thereby produce the desired decorative indicia, e.g., the word "LOVE." In particular, the laser beam impinges the non-reflective coating on the gemstone's table to vaporize that coating and engrave the underlying surface of the gemstone, i.e., the material of the gemstone contiguously underlying its table, to produce indicia 10 as shown in FIG. 6. The holder 26 or 28, being laser-light transmissive, enables the incident laser beam 30 to vaporize the coating, engrave the underlying material and then to readily exit the interior of the gemstone, without substantial internal reflection. This action ensures that the gemstone is not damaged by heat or stresses during the engraving process.

Then either the holder 26 or 28 and/or its supporting table (not shown) is moved with respect to the laser marking apparatus 24, so that the next sequentially disposed gemstone 22 is within the line of the laser beam 30 to engrave its coated surface. This procedure is repeated until all of the gemstones 22 have been engraved.

If the holder 26 had been used to support the gemstones 22, its jaws 36A and 36B are then opened to enable the finished decorated gemstones to be removed therefrom and new undecorated gemstones inserted for engraving thereof. If the holder 28 had been used, the engraved gemstones are merely lifted up out of the grooves 42 and new undecorated gemstones inserted for engraving thereof.

It should be appreciated by those skilled in the art that if any exterior surface other than the table of the gemstone 22 is to be engraved, such action may require modification of the holders 26 or 28 to support the gemstones so that the surface to be engraved will be directed upward toward the laser beam.

It should also be appreciated by those skilled in the art, that while the subject invention has particular utility for providing large decorative indicia on semi-precious or man-made gemstones (which in certain embodiments of the invention are limited to monocrystalline gemstones), without risking heat-induced injury thereto, it also has considerable utility for engraving the girdle of diamonds with identifying indicia which is not visible to the naked eye, to produce gemstones marked like those of the prior art. This action is achieved while minimizing, if not eliminating the danger of heat-induced damage to the diamond which would be caused by excessive internal reflections.

For some applications it may be desirable to color the indicia of the stones decorated in accordance with this invention. For example, if it is desired to have the indicia in the table or top surface of the stone 22 be of one or more colors, such can be readily accomplished in accordance with another aspect of this invention. In this regard after the indicia 10 has been engraved in the table surface as described above, some liquid coloring medium 50, e.g., paint, dye, nail enamel, etc., is applied into the recess 10 which defines the indicia. The application of the paint or other coloring medium can be achieved by any suitable means, e.g., a paintbrush or some other applicator (not shown). Preferably the coloring agent application is accomplished within a vacuum chamber (not shown) to ensure that the coloring agent completely fills the engraved indicia. The vacuum aids the coloring agent to flow by capillary action into all the nooks and crannies of the indicia, particular very fine portions of thereof. This is particularly important where the coloring agent is somewhat viscous, as is the case of nail enamel or paint. Any excess coloring agent which extends above the plane of the top surface (table) of the stone as well as any excess coloring agent which extends thereover, i.e., onto portions of the top surface contiguous with the engraved indicia, should be removed in the interest of aesthetics.

Figure 7:
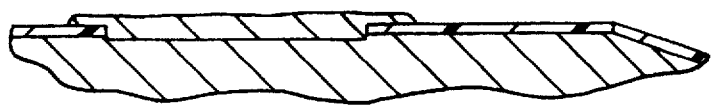
FIG. 7 is an enlarged, vertical sectional view, like that of FIG. 6, but showing the introduction of a colored inlay material into the recess engraved in the top facet or table of the gemstone by the laser during the procedure of forming colored decorative indicia in that gemstone.
Figure 8:
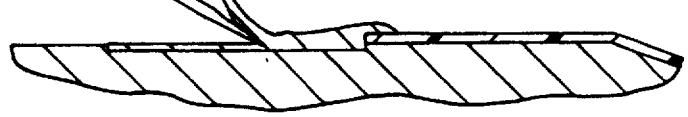
FIG. 8 is an enlarged sectional view, similar to FIG. 7, but showing a subsequent step to that shown in FIG. 7 in the formation of a decorated gemstone.

In FIG. 7 there is shown a portion of the table or top surface of a gemstone stone 22 engraved by a laser beam as described earlier, with the laser-light absorptive coating 34, e.g., paint, ink, or dye, still disposed on that surface and the contiguous facets. To decorate the indicia 10 engraved in that surface the liquid coloring agent 50 is applied into that indica. As mentioned above any excess coloring agent, e.g., paint, 50 which extends out of the indicia and over the contiguous portions of the top or table surface of the stone, and which is designated by the reference number 52, should be removed. In order to achieve that end, any suitable wiping or scraping means may be used. In FIG. 8 there is shown one such exemplary means. Thus, as can be seen a razor blade 54 or other sharp knife blade is provided, and is used to scrape the excess coloring material 52 from the indicia 10. The razor blade may also be used to remove light absorptive coating 34 from the stone, if desired, or some other means may be used to remove that coating.

It should be pointed out at this juncture that the light absorptive coating 34 could have been removed prior to coloring the indicia. In fact, as discussed earlier, in some applications a light absorptive coating may not be necessary to engrave the indicia with the laser beam. Thus, in either case the coloring agent is applied into the engraved indicia, and any excess coloring agent extending above or over the contiguous surface of the gemstone removed.

It should also be pointed out that the coloring agent 50 for coloring the indicia 10 may be a single color so that the entire engraved indicia is of one color, or may be of plural colors so that portions of the indicia are of one color and other portions of other color(s).

Figure 9:
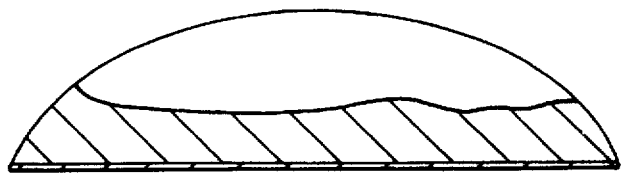
FIG. 9 is an enlarged sectional view, similar to FIG. 6 but showing an initial step in the decoration of a cabochon cut stone with colored indicia in the bottom surface of the stone for visibility through the stone.

In FIG. 9 there is shown a cabochon stone 100 having a domed or convex upper surface 102, and a planar bottom surface 104. The bottom surface 104 is arranged to have indicia 10 formed by a laser beam in a similar manner as described heretofore. As will be appreciated by those skilled in the art the resulting indicia will be visible through the stone, i.e., from the convex surface 102, instead of directly (as is the case of the faceted stone 22 having the indicia engraved in its top surface or table shown in FIG. 2).

If the indicia 10 in the cabochon stone 100 is to be colored such action is accomplished in a similar manner as described above. To that end, the bottom surface 104 of the stone is preferably provided with a laser-light absorptive coating 34, e.g., paint, ink, or dye, as shown in FIG. 9, and the indicia 10 engraved therein in the same manner as described above with respect to the faceted stone 22. After the indicia 10 is engraved by the laser beam, the paint 50 (or some other liquid coloring agent) is applied into that indica in the same manner as described above, and as shown in FIG. 10.

Figure 11:
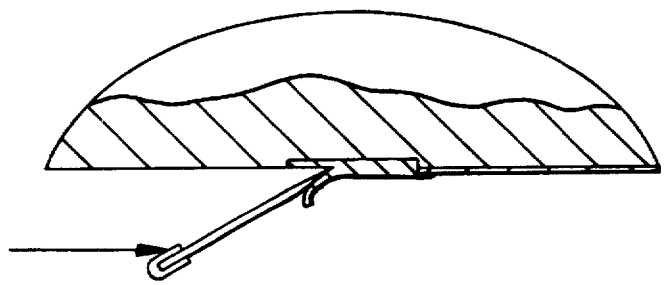
FIG. 11 is an enlarged sectional view like that of FIG. 9 but showing a subsequent step to produce indicia of a single color.

If it is desired that the indicia 10 be of a single color and on a background of the natural color of the stone 100, any excess coloring agent 52 which extends out of the indicia and over the contiguous portions of the bottom surface of the stone should be removed. This may be accomplished in the same manner as described earlier by means of the razor blade 54 scraping away the excess coloring material as shown in FIG. 11. The razor blade may be used to scrape away the laser-light absorptive coating 34, as well, providing that such a coating was used and is still in place.

Figure 10:
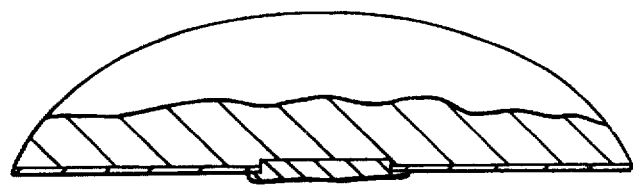
FIG. 10 is an enlarged sectional view like that of FIG. 9, but showing a subsequent step to produce indicia of two colors.

If it is desired that the indicia 10 be of one color and on a background of a second color, the light absorptive coating 34 can be used to form the background color as shown in FIG. 10. Preferably, the light absorptive coating 34 is opaque so that it covers any excess coloring agent 52 which extends out of the indicia 10 and over the contiguous portions of the bottom surface of the stone. The covering action of the opaque coating 34 will obscure any excess coloring agent 52 which extends beyond the margins of the indicia from being seen when the indicia of the stone is viewed from its top surface 102 through its body. If it is desired that the bottom surface 104 be perfectly planar, those excess portions of the coloring agent 52 extending above the surface of the light absorptive coating 34 may be removed, e.g., scraped away.

It should be pointed out at this juncture that the coloring agent 50 used for coloring the indicia of the cabochon stone 100 may be a single color (so that the entire engraved indicia is of one color), or may be of plural colors (so that portions of the indicia are of one color and other portions of other color(s)), whether or not the background for the indicia is another color (like shown in FIG. 11) or is the natural color of the stone (like shown in FIG. 10).

Without further elaboration the foregoing will so fully illustrate our invention that others may, by applying current or future knowledge, adapt the same for use under various conditions of service.

We claim:

1. A method for decorating a gemstone with visible indicia, said indicia conveying a message and being readily visible from a predetermined exterior surface of a gemstone, said method comprising generating a laser beam and directing the beam to a portion of the gemstone to engrave said indicia therein, said indicia comprising a shallow depth recess in an exterior surface of said gemstone, and filling said exterior surface with an inlay material of a visually distinctive color, wherein said engraving is conducted with an apparatus comprising support means for supporting the gemstone thereon and laser means for generating said laser beam and for directing said beam to the predetermined exterior surface of the gemstone to engrave said indicia therein, said support means including a girdle engaging recess which is constructed to engage an exterior surface of the gemstone other than said predetermined exterior surface by contacting at least a portion of said other exterior surface in such a manner that a significant portion of said laser beam is precluded by said support means from reflecting internally within the gemstone or contacting said support means, thereby ensuring that the gemstone is not damaged by said laser beam.

2. The method of claim 1 wherein said inlay material is applied as a liquid to fill said shallow depth recess.

3. The method of claim 2 additionally comprising the step of wiping said exterior surface after said inlay material has be disposed therein to remove any of said inlay material located on said exterior surface outside of said shallow depth recess.

4. The method of claim 1 wherein said inlay material is provided as a portion of a first color and at least another portion of a second and different color than said first color.

5. The method of claim 1 wherein said predetermined exterior surface comprises a first exterior surface, and wherein said indicia is engraved in said first exterior surface.

6. The method of claim 1, wherein said indicia is engraved in an exterior surface of said gemstone other than said predetermined exterior surface.

7. The method of claim 1 wherein said gemstone is natural.

8. The method of claim 1 wherein said gemstone is monocrystalline.

9. The method of claim 1 wherein the gemstone includes a peripheral girdle portion, the peripheral girdle portion forming the other exterior surface of the gemstone, and wherein said girdle engaging recess engages only the peripheral girdle.

10. A method for decorating a gemstone with visible indicia, said indicia conveying a message and being readily visible from a predetermined exterior surface of a gemstone, said method comprising generating a laser beam and directing the beam to a portion of the gemstone to engrave said indicia therein, said indicia comprising a shallow depth recess in an exterior surface of said gemstone, wherein said engraving is conducted with an apparatus comprising support means for supporting the gemstone thereon and laser means for generating said laser beam and for directing said beam to the predetermined exterior surface of the gemstone to engrave said indicia therein, said support means including a girdle engaging recess which is constructed to engage an exterior surface of the gemstone other than said predetermined exterior surface by contacting at least a portion of said other exterior surface in such a manner that a significant portion of said laser beam is precluded by said support means from reflecting internally within the gemstone or contacting said support means, thereby ensuring that the gemstone is not damaged by said laser beam.

11. The method of claim 10 wherein the gemstone includes a peripheral girdle portion, the peripheral girdle portion forming the other exterior surface of the gemstone, and wherein said girdle engaging recess engages only the peripheral girdle.

* * * * *